Patented Sept. 20, 1938

2,130,550

UNITED STATES PATENT OFFICE 2,130,550

TANNING MATTER

Ernst Koch, Frankfort-on-the-Main-Hochst, Karl Dachlauer, Hofheim, and Christoph Thomsen, Frankfort-on-the-Main-Hochst, Germany, assignors to I. G. Farbenindustrie Aktiengesellschaft, Frankfort-on-the-Main, Germany No Drawing. Application December 28, 1936, Serial No. 117,968. In Germany October 3, 1935

4 Claims. (Cl. 149—5)

The present invention relates to tanning matters.

We have found that tanning matters may be obtained from materials containing lignin by treating them with halogen or agents giving off halogen and rendering water-soluble the products thus obtained by treating them with salts of the sulphurous acid in the presence or absence of aldehydes.

As materials containing lignin there may, for instance, be used wood, bark and the residues of the saccharification of wood. These materials are treated with halogen preferably either in an aqueous, alkaline, neutral or acid suspension or in an organic liquid which under the conditions of test does not react with halogen. The material containing lignin may also be moistened with water or steam and then be treated with gaseous halogen which, if required may be diluted by an inert gas. The preparation of chloro-lignin is known (see Fuchs, "Chemie des Lignin," page 97).

The material entirely or incompletely treated with halogen is then treated, if required after it has been separated from the suspending agent and sufficiently washed, in an aqueous suspension with a watersoluble salt of the sulphurous acid, such as sodium sulphite, potassium sulphite, sodium bisulphite, ammonium sulphite, ammonium bisulphite and others. The reaction is accelerated by heating the material to a temperature up to about 100° C. In some cases it may be advantageous previously to neutralize the halogen hydracid which may be present. If in this case an excess of alkali is added, the salt of sulphurous acid may be obtained by introducing gaseous sulphurous acid. Furthermore, on rendering watersoluble the halogenated material an addition of aldehydes, such as formaldehyde or acetaldehyde, is often advantageous. It is also possible, during or after the rendering watersoluble, to condense the product of halogen and lignin with other compounds, for instance aromatic hydroxy compounds, or the sulphonic acids thereof, if necessary with the aid of aldehyde.

The quantity of the salt of sulfurous acid may vary, it amounts at least to about half the weight of the dry chloro-lignin.

The products obtained remain watersoluble also after having been acidified and in the acid condition they are good tanning materials. The leather tanned therewith is of a light-brown color, full-bodied and of an excellent firmness and solidity. The tanning materials may be used as such or in combination with other tanning materials. It is also possible to impart to the tanning materials a further plumping power by the addition of natural or artificial resins or sparingly soluble phlobaphenes of vegetable tanning materials (phenol-formaldehyde-resins, dihydroxy-diphenyl-sulphonic resins or colophony resins or the sparingly soluble portions of quebracho).

The alkali metal salts of the products may be obtained by evaporating the aqueous solution, likewise the free acids after a previous acidification of the solution. If necessary the solid final product is washed. The salts as well as the free acids are brown non-hygroscopic powders. The free acid shows the tanning action described.

The following examples serve to illustrate the invention, but they are not intended to limit it thereto, the parts being by weight:

(1) Into a suspension of 250 parts of saccharification residue (obtained by the treatment of chips of pine wood with concentrated hydrochloric acid) in 500 parts of water gaseous chlorine is introduced at 10° C.–15° C. until saturation is attained. The whole is then filtered, washed and the residue is dried. About 280 parts of chloro-lignin are obtained.

100 parts of this chloro-lignin in 250 parts of water are first mixed with 5 parts of caustic soda. 20 parts of a formaldehyde solution of 30 per cent. strength are then added and the whole is heated within one hour to about 95° C. 50 parts of sodium sulphite are then added and the mixture is stirred for 6 hours at 95° C. The product is then soluble in water to a clear solution, even after having been acidified with acetic acid.

If calf pelt is tanned with this acidified solution, a light-brown, plump leather is obtained.

(2) 50 parts of the chloro-lignin obtained according to Example 1 are heated for 8 hours to 105° C. in 150 parts of water together with 30 parts of sodium sulphite. A brown solution without any residue is obtained. If this solution is acidified with sulphuric acid until a pH value of 3.5 is attained and animal skin is tanned with this liquor, there is obtained a light-brown leather of a good firmness and solidity.

(3) 25 parts of the chloro-lignin obtained according to Example 1 in 75 parts of water are mixed with 1.5 parts of caustic soda, 20 parts of formaldehyde solution of 30 per cent. strength and 15 parts of sodium sulphite are then added, the mixture is gradually heated to 95° C. and stirred until the whole has been dissolved. The solution is then acidified with oxalic acid. If cow pelt is tanned with the acidified solution a leather is obtained having the same properties as that of Example 1.

(4) 500 parts of pine bark dried by exposure to air are freed from the tanning material by extracting them with cold and hot water. About 390 parts of residue (dried) remain. Into a suspension of 100 parts of this residue in 200 parts of water chlorine is introduced at 5° C. until saturation is attained. The whole is filtered and the residue in 250 parts of water which has been washed is mixed with 50 parts of sodium sulfite and 60 parts of formaldehyde solution of 30 per cent. strength. The mixture is heated in the course of 1 hour to 100° C. and stirred at this temperature for 8 hours. The non-dissolved cellulose is removed by filtration and the filtrate is acidified with sulfuric acid until a pH value of 3.0 is attained. If calf pelt is tanned with this tanning liquor, a light-brown leather of quebracho character is obtained.

(5) Chlorine is introduced, at 10° C.–20° C., into a suspension of 900 parts of hydrochloric lignin in 1500 parts of water until saturation is attained. The chloro-lignin obtained is then filtered with suction and washed. There are obtained 1740 parts of moist chloro-lignin containing 43 per cent. of water.

440 parts of this moist chloro-lignin are suspended with 300 parts of water and 300 parts of caustic soda solution of 10 per cent. strength and the suspension is then mixed with 250 parts of sodium sulfite, while stirring. The whole is heated within 1 hour to about 100° C. and stirred for 5 hours at this temperature. By an acidification with sulfuric acid and oxalic acid until a pH value of about 3.0 is attained there is produced a tanning material with the aid of which calf pelt and cow pelt is rapidly and uniformly tanned.

We claim:

1. The products obtainable by causing a water-soluble salt of sulfurous acid to act in an aqueous solution upon chloro-lignin, said products being in the form of their free acids brown and non-hygroscopic powders showing a tanning effect upon animal skin.

2. The products obtainable by causing a lower aliphatic aldehyde and a watersoluble salt of sulfurous acid to act in an aqueous solution upon chloro-lignin, said products being in the form of their free acids brown and non-hygroscopic powders showing a tanning effect upon animal skin.

3. The product obtainable by causing sodium sulfite to act upon chloro-lignin in an aqueous solution in the presence of sodium hydroxide at a temperature of about 100° C. and acidifying the mixture, said product being in the form of its free acid a brown and non-hygroscopic powder showing a tanning effect upon animal skin.

4. The product obtainable by causing sodium sulfite and formaldehyde to act upon chloro-lignin and aqueous solution at a temperature of about 100° C. and acidifying the mixture, said product being in the form of its free acid a brown and non-hygroscopic powder showing a tanning effect upon animal skin.

ERNST KOCH.
KARL DACHLAUER.
CHRISTOPH THOMSEN.